United States Patent [19]

Buchanan et al.

[11] Patent Number: 5,514,271
[45] Date of Patent: May 7, 1996

[54] UNDERFLOW CYCLONE WITH PERFORATED BARREL

[75] Inventors: John S. Buchanan; Christopher G. Smalley, both of Hamilton, N.J.

[73] Assignee: Mobil Oil Corporation, Fairfax, Va.

[21] Appl. No.: 234,794

[22] Filed: Apr. 28, 1994

[51] Int. Cl.⁶ .............................. C01G 11/00; B04C 3/06
[52] U.S. Cl. .................... 203/113; 208/153; 208/161; 55/452; 209/720; 209/721; 209/722; 209/723; 422/147
[58] Field of Search .................... 208/113, 153, 208/161; 55/447, 452, 460; 209/720, 722, 723, 721; 422/147

[56] References Cited

U.S. PATENT DOCUMENTS

| | | | |
|---|---|---|---|
| 2,672,215 | 3/1954 | Schmid | 183/84 |
| 3,970,437 | 7/1976 | Van Diepenbroek et al. | 55/127 |
| 4,151,044 | 4/1979 | Choi | 201/12 |
| 4,956,091 | 9/1990 | Van Den Akker | 210/512.2 |
| 5,002,671 | 3/1991 | de Villiers et al. | 210/740 |
| 5,055,177 | 10/1991 | Haddad et al. | 208/161 |
| 5,190,650 | 3/1993 | Tammera et al. | 210/256 |
| 5,372,707 | 12/1994 | Buchanan et al. | 208/161 |

FOREIGN PATENT DOCUMENTS 997823  2/1983  U.S.S.R. .

*Primary Examiner*—E. Rollins Cross
*Assistant Examiner*—Walter D. Griffin
*Attorney, Agent, or Firm*—Malcolm D. Keen; Dennis P. Santini; Richard D. Stone

[57] ABSTRACT

A cyclone and process for fluidized catalytic cracking of heavy oils is disclosed. Gas and entrained solids are added tangentially around a vapor outlet tube in a cylindrical tube cyclone body. Solids and some gas is withdrawn via a plurality of openings radially and longitudinally distributed in the cylindrical sidewall of the cyclone body. Distributed withdrawal replaces or reduces conventional underflow of solids from an end of cyclone outlet and reduces solids reentrainment. 0–5 micron particle removal is enhanced by reducing eddy formation and particle bouncing near the cyclone sidewall. The device may be used as an FCC regenerator third stage separator.

11 Claims, 5 Drawing Sheets

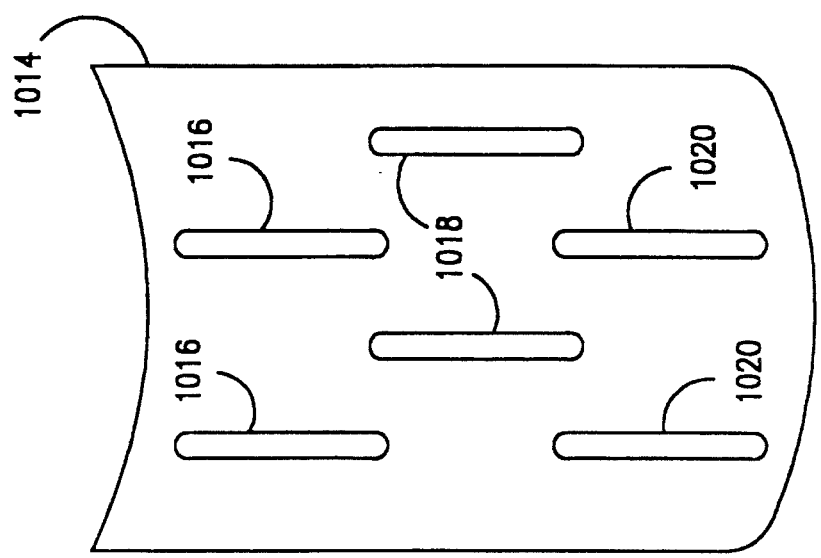
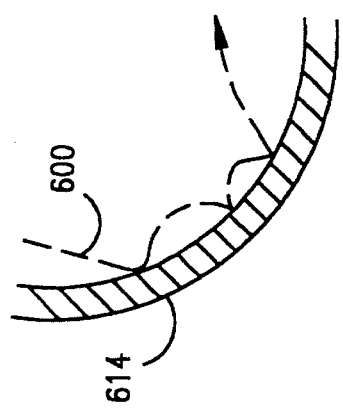
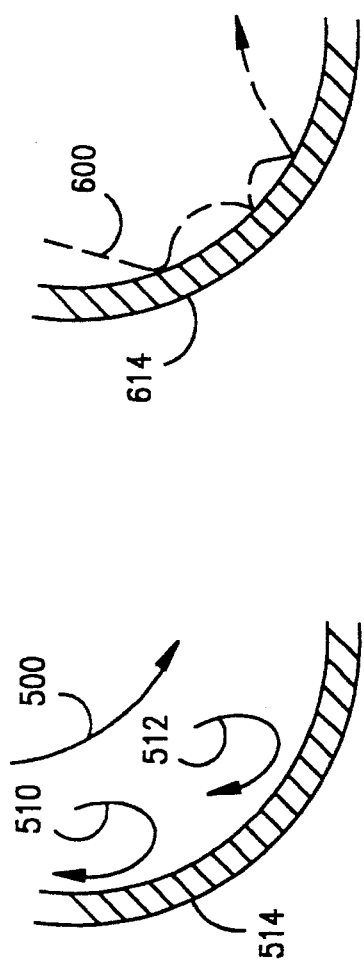
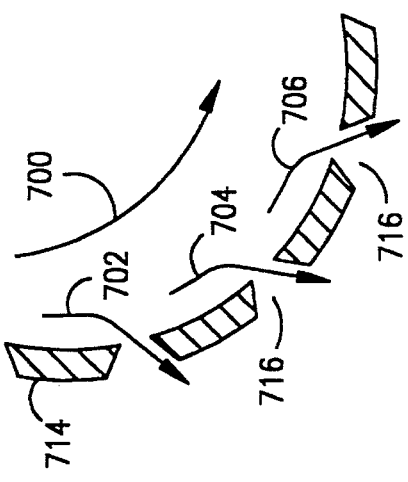

UNDERFLOW CYCLONE WITH PERFORATED BARREL

BACKGROUND OF THE INVENTION

1. Field of the Invention

The field of the invention is fluidized catalytic cracking of heavy hydrocarbon feeds and cyclones for separating fine solids from vapor streams.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to $CO_2$ within the regenerator (to conserve heat and reduce air pollution) many FCC operators add a CO combustion promoter. U.S. Pat. Nos. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Most FCC's units are all riser cracking units. This is more selective than dense bed cracking. Refiners maximize riser cracking benefits by going to shorter residence times, and higher temperatures. The higher temperatures cause some thermal cracking, which if allowed to continue would eventually convert all the feed to coke and dry gas. Shorter reactor residence times in theory would reduce thermal cracking, but the higher temperatures associated with modern units created the conditions needed to crack thermally the feed. We believed that refiners, in maximizing catalytic conversion of feed and minimizing thermal cracking of feed, resorted to conditions which achieved the desired results in the reactor, but caused other problems which could lead to unplanned shutdowns.

Emergency shutdowns cause substantial economic losses. Modern FCC units must run at high throughput, and for years between shutdowns, to be profitable. Much of the output of the FCC is needed in downstream processing units, and most of a refiners gasoline pool is usually derived from the FCC unit. It is important that the unit operate reliably for years, and accommodate a variety of feeds, including heavy feeds.

The unit must also operate without exceeding local limits on pollutants or particulates. The catalyst is somewhat expensive, and most units have hundred tons of catalyst in inventory. FCC units circulate tons of catalyst per minute, the large circulation being necessary because feed rates are large and for every ton of oil cracked roughly 5 tons of catalyst are needed.

These large amounts of catalyst must be removed from cracked products lest the heavy hydrocarbon products be contaminated with catalyst and fines. Even with several stages of cyclone separation some catalyst and catalyst fines invariably remain with the cracked products. These concentrate in the heaviest product fractions, usually in the Syntower (or main FCC fractionator) bottoms, sometimes called the slurry oil because so much catalyst is present. Refiners frequently let this material sit in a tank to allow more of the entrained catalyst to drop out, producing CSO or clarified slurry oil.

The problems are as severe or worse in the regenerator. In addition to the large amounts of catalyst circulation needed to satisfy the demands of the cracking reactor, there is an additional internal catalyst circulation that must be dealt with. In most bubbling bed catalyst regenerators, an amount of catalyst equal to the entire catalyst inventory will pass through the regenerator cyclones every 15 minutes or so. Most units have several hundred tons of catalyst inventory. Any catalyst not recovered using the regenerator cyclones will remain with the regenerator flue gas, unless an electrostatic precipitator, bag house, or some sort of removal stage is added at considerable cost. The amount of fines in most FCC flue gas streams exiting the regenerator is enough to erode turbine blades if a power recovery system is installed to recover some of the energy in the regenerator flue gas stream. Generally a set of cyclonic separators (known as a third stage separator) is installed upstream of the turbine to reduce the catalyst loading and protect the turbine blades.

While high efficiency third stage cyclones have increased recovery of conventional FCC catalyst from the flue gas leaving the regenerator they have not always reduced catalyst and fines losses to the extent desired. Some refiners were forced to install electrostatic precipitators or some other particulate removal stage downstream of third stage separators to reduce fines emissions.

Many refiners now use high efficiency third stage cyclones to decrease loss of FCC catalyst fines to acceptable levels and/or protect power recovery turbine blades. However, current and future legislation will probably require another removal stage downstream of the third stage cyclones unless significant improvements in efficiency can be achieved.

When a third stage separator is used a fourth stage separator is typically used to process the underflow from the third stage separator. The fourth stage separator is generally a bag house.

Third stage separators typically have 50 or 100 or more small diameter cyclones. One type of third stage separator is described in "Improved hot-gas expanders for cat cracker flue gas" Hydrocarbon Processing, March 1976. The device is fairly large, a 26 foot diameter vessel. Catalyst laden flue gas passes through many swirl tubes. Catalyst is thrown against the tube wall by centrifugal force. Clean gas is withdrawn up via a central gas outlet tube while solids are discharged through two blowdown slots in the base of an outer tube. The device was required to remove most of the 10 micron and larger particles. The unit processed about 550,000 lbs./hour of flue gas containing 300 lbs/hour of catalyst particles ranging from sub-micron to 60 micron sized particles.

We wanted to improve the operation of cyclones, especially their performance on the less than 5 micron particles, which are difficult to remove in conventional cyclones and, to some extent, difficult to remove using electrostatic precipitation.

Based on observations and testing of a horizontal, transparent, positive pressure cyclone, we realized cyclones had a problem handling this 5 micron and smaller size material.

We discovered that turbulent vortices grow along the wall of the cyclones and then shed into the main tangential flow. This caused the particles to hop and bounce away from the wall, reducing collection efficiency.

We wanted to attack the root cause of the problem, and improve the stability of the flow pattern through the cyclone. We discovered that perforations in the body of the cyclone could be used to remove minor amounts of gas with the solids, and have a major impact on stabilizing flow patterns. In addition, by withdrawing some of the gas, and essentially all of the solids, from a plurality of radially distributed openings we eliminated particle reentrainment.

BRIEF SUMMARY OF THE INVENTION

The present invention provides a cyclone separator comprising a cylindrical cyclone body having a length and a cylindrical axis; a tangential vapor inlet connective with an inlet end of said cyclone body for a stream of vapor and entrained solids; a cylindrical vapor outlet tube within said inlet end of said cylindrical cyclone body for withdrawal of gas with a reduced entrained solids content, said outlet tube having a cylindrical axis aligned with said cylindrical axis of said cyclone body; a plurality of radially and longitudinally distributed solids outlets for removing most of said entrained solids and a minor amount of gas, comprising at least two sets of openings, slots or perforations traversing a vertical distance equal to at least one half of said diameter of said cyclone body, and wherein said sets of openings are radially distributed by at least 60°.

In another embodiment, the present invention provides in a fluidized catalytic cracking process wherein a heavy feed is catalytically cracked by contact with a regenerated cracking catalyst in a cracking reactor to produce lighter products and spent catalyst, and wherein spent catalyst is regenerated in a catalyst regeneration means containing primary and secondary separators for recovery of catalyst and fines from flue gas to produce a flue gas stream containing entrained catalyst fines, the improvement comprising use of a third stage separator to remove at least a portion of the catalyst fines from the flue gas, said third stage separator comprising a cylindrical cyclone body having a length and a cylindrical axis; a tangential vapor inlet connective with an inlet end of said cyclone body for a stream of vapor and entrained fines; a cylindrical vapor outlet tube within said inlet end of said cylindrical cyclone body for withdrawal of gas with a reduced entrained fines content, said outlet tube having a cylindrical axis aligned with said cylindrical axis of said cyclone body; and a plurality of radially and longitudinally distributed fines outlets for removing most of said entrained fines and a minor amount of gas, comprising at least two sets of openings over at least a third of the length of said cyclone body and wherein said sets of openings are radially distributed by at least 60°.

BRIEF DESCRIPTION OF THE DRAWINGS

FIG. 5 and 6 (prior art) show particle flow in the cyclone barrel of conventional cyclones.

FIG. 7 (invention) shows particle flow as stabilized by the perforated cyclone barrel of the invention.

FIG. 10 (invention) shows a preferred placement of slots in the cyclone barrel.

DETAILED DESCRIPTION

Figure 1:
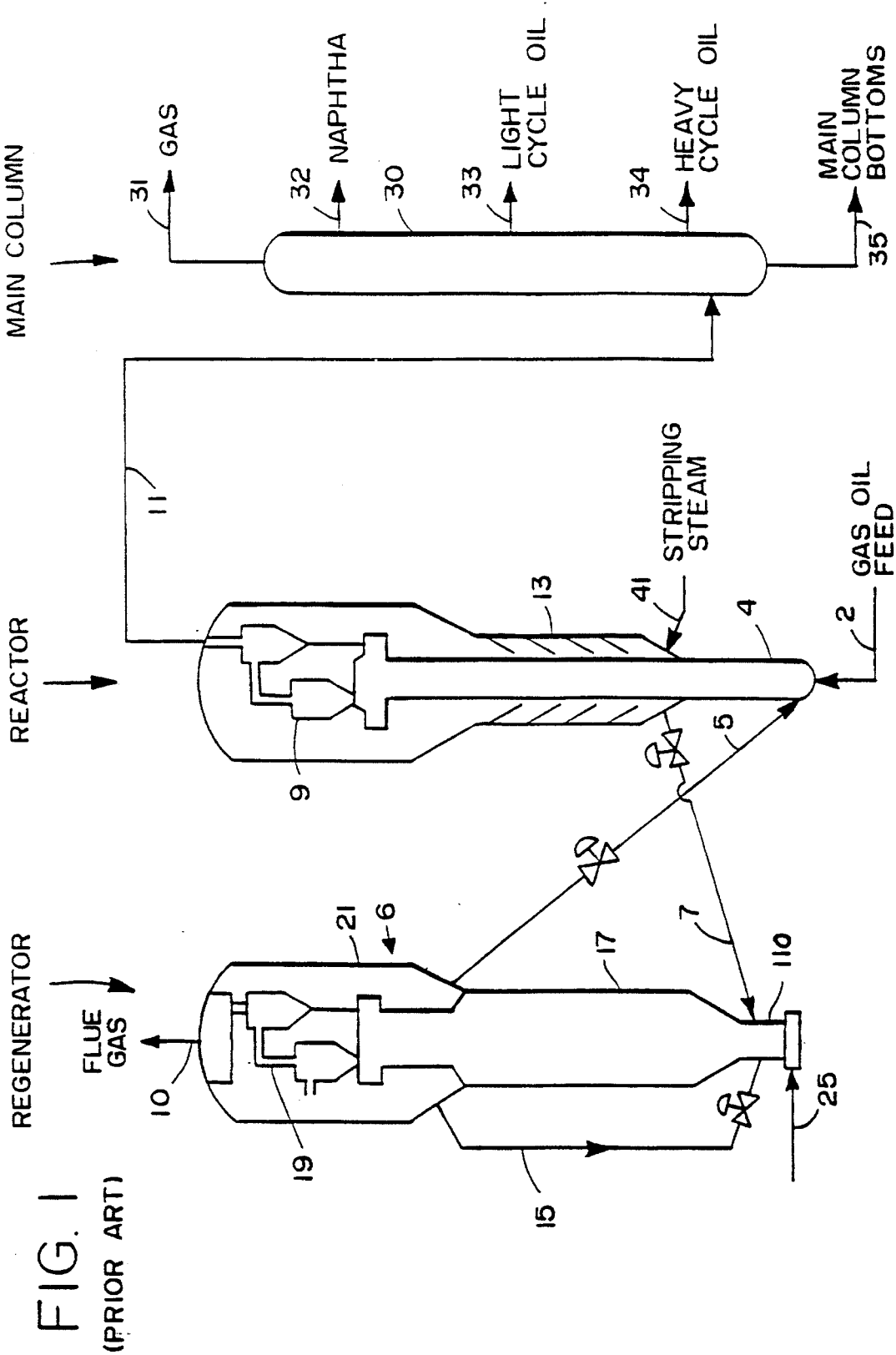
FIG. 1 (prior art) is a simplified schematic view of an FCC unit of the prior art.

The present invention can be better understood by reviewing it in conjuction with a conventional riser cracking FCC unit. FIG. 1 illustrates a fluid catalytic cracking system of the prior art. There are myriad other FCC units which can benefit from the process of the present invention, but the process of the present invention works well with this type of FCC unit.

A heavy feed in line 2 such as a gas oil, vacuum gas oil is added to riser reactor 4 via feed injection nozzles. The cracking reaction is completed in the riser reactor. Spent catalyst and cracked products discharged from the riser reactor pass through cyclones 9 which efficiently separate most of the spent catalyst from cracked product. Cracked product is discharged via conduit 11 to the fractionator.

Spent catalyst is discharged down from a dipleg of cyclones 9 into catalyst stripper 13 where stripping steam is added via line 41. The stripped hydrocarbons, and stripping steam are removed with cracked.

Stripped catalyst is discharged via line 7 into catalyst regenerator 6.

Catalyst is regenerated in coke combustor 17 by contact with air, added via line 25. Regenerated catalyst is discharged into upper vessel 21. Some catalyst is recycled via line 15 to the base 110 of the coke combustor. Some catalyst is withdrawn from the regenerator via line 5 and charged into the base of the riser reactor 4 to contact and crack fresh feed. Flue gas, and some entrained catalyst, is discharged into multiple stages of cyclones 19 and discharged via line 10.

Cracked products removed from the reactor via line 11 are charged into the main column 30, which produces a gas product in line 31, a naphtha product in line 32, a light cycle oil product in line 33, a heavy cycle oil product in line 34 and a main column bottoms product in line 35.

FIG. 1 does not show a third stage separator. Line 10 in most refineries would go to some type of third stage separator (not shown), usually one involving 50 or 100 (or more) small diameter horizontal cyclones. Purified flue gas would then pass through an optical power recovery turbine (not shown) then go to a stack for discharge to the atmosphere, via some flue gas clean up devices, such as an SOx scrubber, or elastrostatic precipitator.

Figure 2:
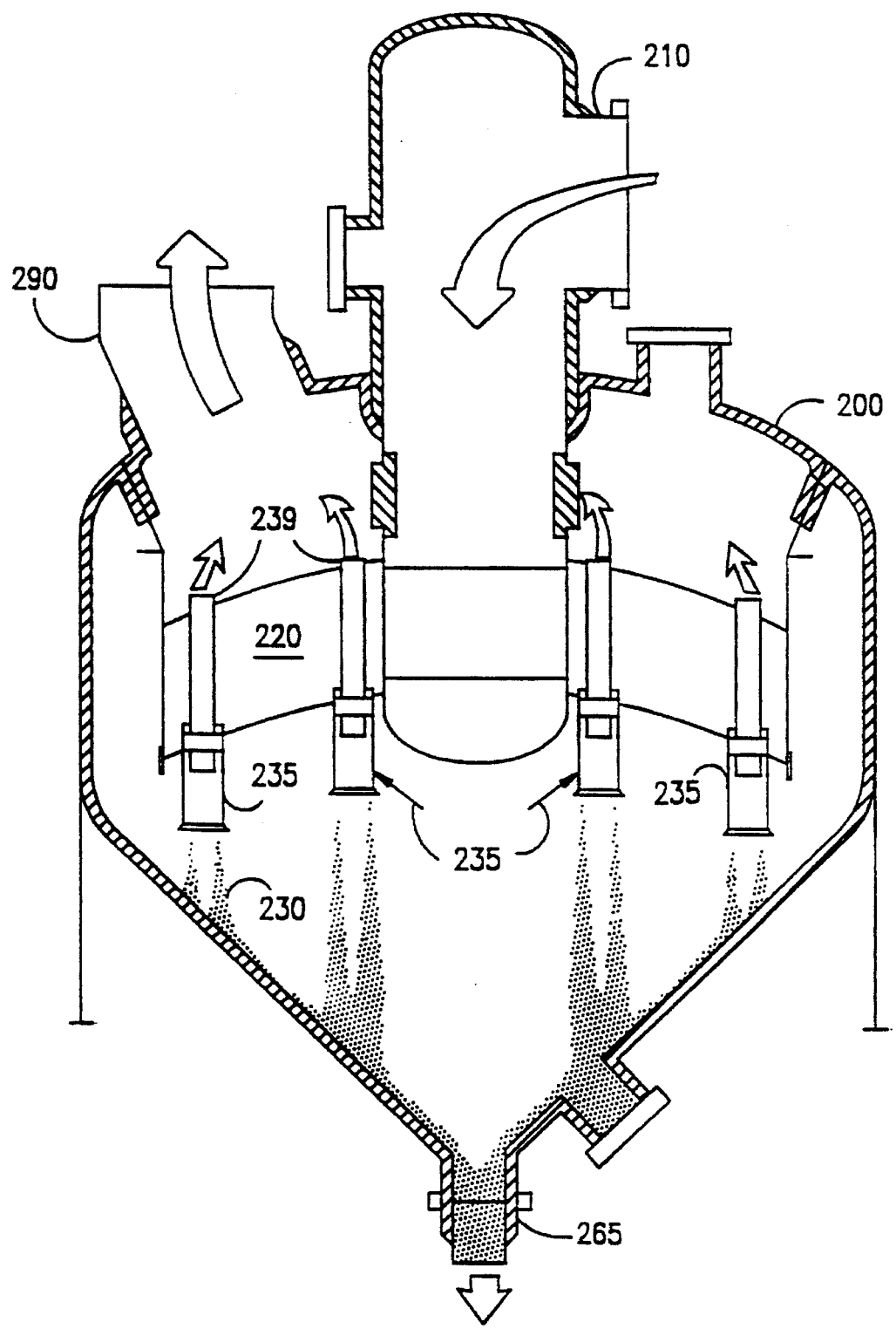
FIG. 2 (prior art) is a simplified schematic view of a third stage separator of the prior art.

FIG. 2 (Prior Art) is similar to FIG. 1 of Improved hot-gas expanders for cat cracker flue gas, Hydrocarbon Processing, March 1976, p. 141. This article is incorporated by reference.

Third stage separator 200 receives a fines containing FCC flue gas via inlet 210. Gas is distributed via plenum 220 to the inlets of a plurality of small diameter ceramic tubes 235 containing swirl vanes not shown. Fines collect on the walls of tubes 235 and are discharged from the base of the tubes as an annular stream of solids 230. A clean gas stream is withdrawn via outlet tubes 239 to be removed from the vessel via outlet 290. Solids are removed via solids outlet 265.

Figure 4:
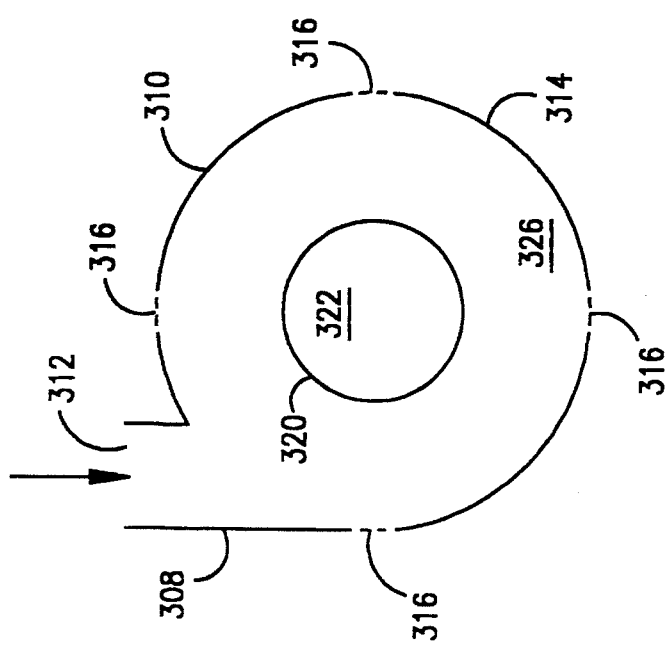
FIG. 4 (invention) is an end view of the FIG. 3 cyclone.
Figure 3:
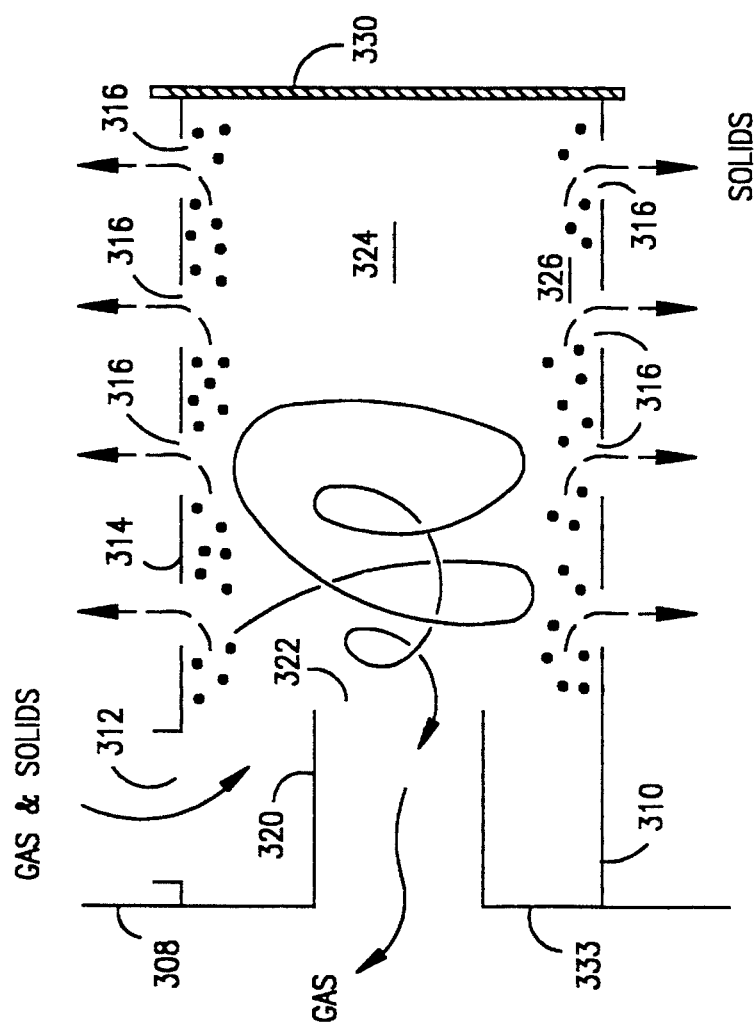
FIG. 3 (invention) is a simplified sectional view of a preferred underflow cyclone.

FIG. 3 shows a simplified sectional view of a preferred underflow cyclone of the invention, while FIG. 4 shows an end view of the same cyclone. Like elements have like numerals.

A flowing stream of gas and entrained solids flows through tangentially aligned inlet duct 308 with inlet opening 312. The gas flow spirals around outlet tube 320 into region 324, where centrifugal force throws particulates to the wall 314 of the cyclone 310. Solids collect in region 326, a relatively thin, circulating layer of particles, which are discharged through a plurality of openings 316 which are radially and longitudinally distributed about the cyclone barrel. A minor amount of gas, typically in the 2 to 20% range, is discharged with the solids through the holes or slots in the cyclone barrel. End plate 330 seals the end of the cyclone barrel opposite the clean gas outlet 322. Opposing end plate 333 contains outlet pipe 320, forming opening 322.

FIG. 4, an end view of the cyclone, gives a better idea of the interplay between the tangential inlet duct 308 and the outlet pipe 320 in cyclone 310. It also shows that four sets of openings 316 are evenly radially distributed about cyclone barrel 314, and that all cylindrical parts of the device have a common axis.

FIGS. 5 and 6 (prior art) show particle flow in the cyclone barrel of conventional cyclones. FIG. 5 shows one type of reentrainment mechanism, whereby the bulk flow of gas, indicated as streamline 500, against the barrel 514 of the cyclone induces the formation of localized eddies 510 and 512. This gas phase turbulence, combined with elastic collisions with the wall, can lead to an erratic particle "path, shown as streamline 600 in FIG. 6. These mechanisms will transport particulates from the walls 614 of the cyclone barrel back into the main body of the cyclone to be reentrained by gas flowing therethrough."

FIG. 7 (invention) shows how particle flow is stabilized by the perforations in the cyclone barrel. The gas, and particulates, have some place to go rather than back into the gas mainstream. Thus the bulk flow of gas, shown as streamline 700, can continue without reentrainment of particulates. Particulates, and a minor amount of gas, flow to the walls of cyclone barrel 714, but are allowed to exit the walls via a plurality of openings 716. Exit streamlines 702, 704, and 706 are able to pass out of the cyclone, so the tendency for particles to bounce or for gas to form eddy currents or vortices is reduced or eliminated.

Figure 9:
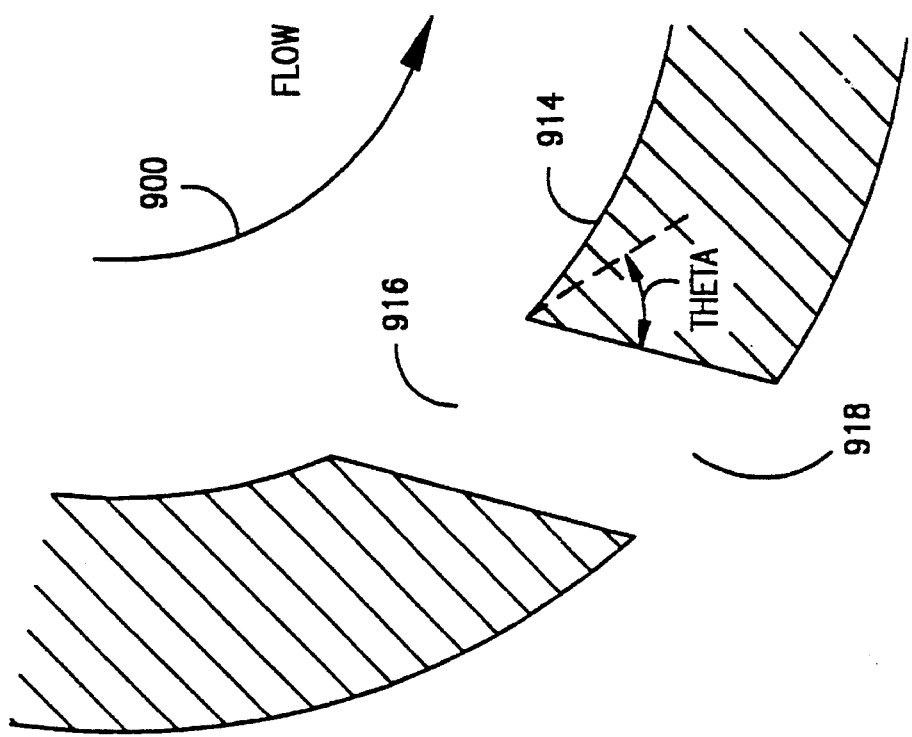
FIG. 8 and 9 (invention) show preferred slot configurations.
Figure 8:
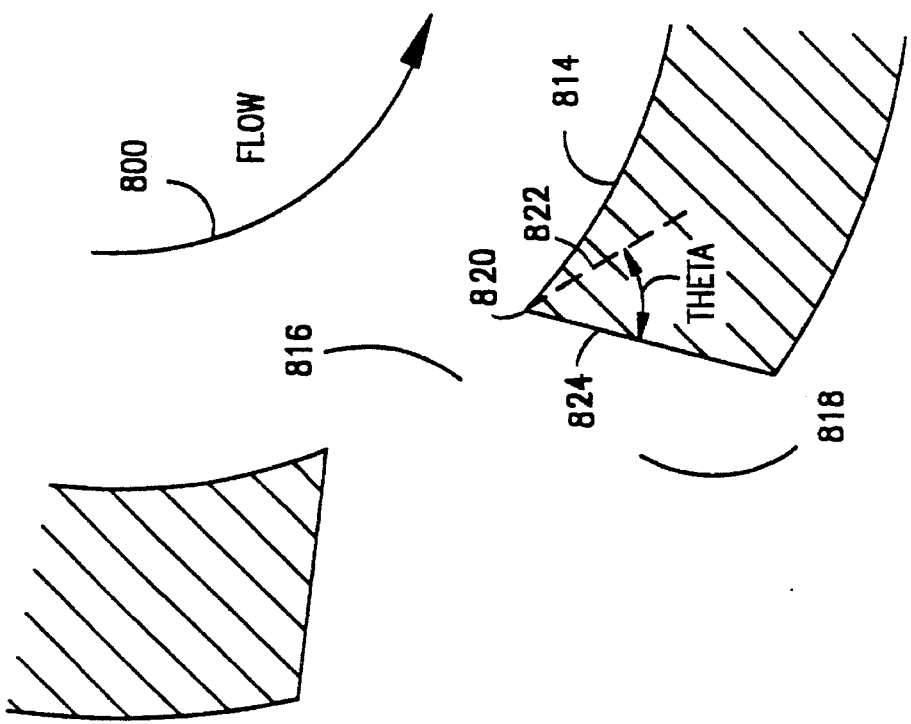

FIG. 8 and 9 (invention) show preferred slot configurations, those which optimize removal of gas and solids from the device. The distinctive factor in FIG. 8 is that each hole or slot has an axis, or plane of the opening, perpendicular to the barrel surface. The slot may increase in cross sectional area as it passes from the interior opening 816 to the cyclone barrel to the outer opening 818 as it passed through the walls 814 of the cyclone barrel, as shown in FIG. 8. The bulk flow of gas is shown as streamline 800.

Alternatively, each slot may have a generally constant cross-section, as shown in FIG. 9. Thus the inlet 916 to the slot or opening has the same size as the outlet 918, as the perforation passes through the walls of the cyclone barrel 914. The bulk flow of gas is shown as streamline 900.

The perforations should be generally slanted to minimize disruption of flow lines of particulates exiting the cyclone barrel through the perforations. Ideally, the angle theta shown in FIGS. 8 and 9 ranges from 10° to 60°, as measured from the surface of the hole adjacent to the leading edge to a line tangent to the inner wall of the barrel at the leading edge of the hole or slot. Thus as shown in FIG. 8 surface 824 is the surface of the hole adjacent to the leading edge 820. Line 822 is tangential to the inner wall of the barrel at the leading edge. Theta is the angle between line 822 and surface 824.

FIG. 10 (invention) shows a preferred arrangement of slots in the cyclone barrel. The perforations 1016, 1018 and 1020 are uniformly distributed about the surface of the cyclone barrel 1014. In the arrangement shown there is some overlap between perforated slot elements. Elements 1016 and 1020 overlap with perforated elements 1018 in the central portion of the device. Generally about 2–20% overlap will prevent localized stagnant regions.

Having provided an overview of the FCC process and the new cyclone design, a more detailed review of the FCC process and of preferred cyclone separators follows.

FCC FEED

Any conventional FCC feed can be used. The feeds may range from typical petroleum distillates or residual stocks, either virgin or partially refined, to coal oils and shale oils. Preferred feeds are gas oil, vacuum gas oil, atmospheric resid, and vacuum resid. The invention is most useful with feeds having an initial boiling point above about 650° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

Relatively high silica zeolite containing catalysts are preferred for use in the present invention. They withstand the high temperatures usually associated with complete combustion of CO to $CO_2$ within the FCC regenerator.

The catalyst inventory may contain one or more additives, either as separate additive particles, or mixed in with each particle of the cracking catalyst. Additives can enhance octane (shape selective zeolites, typified by ZSM-5, and other materials having a similar crystal structure), absorb SOX (alumina), or remove Ni and V (Mg and Ca oxides).

Additives for SOx removal are available commercially, e.g., Katalistiks International, Inc.'s "DeSOx." CO combustion additives are available from catalyst vendors. The catalyst composition, per se, forms no part of the present invention.

FCC REACTOR CONDITIONS

Conventional cracking conditions may be used. Preferred riser cracking reaction conditions include catalyst/oil weight ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 900° to about 1050° F.

It is best to use an atomizing feed mixing nozzle in the base of the riser reactor. Details of a preferred nozzle are disclosed in U.S. Pat. No. 5,289,976, which is incorporated by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 5,055,177 to Haddad et al.

It may be beneficial to use a hot catalyst stripper, heating spent catalyst by adding some hot, regenerated catalyst to spent catalyst. If hot stripping is used, a catalyst cooler may be used to cool heated catalyst upstream of the catalyst regenerator. Suitable designs are shown in U.S. Pat. Nos. 3,821,103 and 4,820,404, Owen, which are incorporated by reference.

FCC reactor and stripper conditions may be conventional.

CATALYST REGENERATION

The process and apparatus of the present invention can use conventional FCC regenerators. Most regenerators are either bubbling dense bed or high efficiency. The regenerator, per se, forms no part of the present invention.

Catalyst regeneration conditions include temperatures of 1200° to 1800° F., preferably 1300° to 1400° F., and full or partial CO combustion.

THIRD STAGE SEPARATOR VESSEL

Our cyclones are preferably used in a third stage separator removing catalyst and fines from regenerator flue gas. In many instances, existing equipment may be used, with the cyclones of the invention substituted for the prior art small diameter, horizontal cyclones.

When used as a third stage separator in FCC there will be so little solids loading at this point in the FCC process that refractory lining may not be needed.

CYCLONE DESIGN

Much of the cyclone design is conventional, such as sizing of the inlet, setting ratios of ID of the outlet tube to other dimensions, etc. Further details, and naming conventions, may be found in Perry's Chemical Engineers' Handbook, 6th Edition, Robert H. Perry and Don Green, which is incorporated by reference. The nomenclature discussion in Gas-Solids Separations, from 20–75 to 20–77, FIG. 20–106, 20–107 and 20–108 is referred to and incorporated by reference.

The slot area, or perforated area, should be large enough to handle anticipated solids flow, and will typically be from 10 to 200% or more of the open area of the conventional reverse flow cyclone solids outlet.

The open area, or the slot area, of the outlets radially distributed on the wall of the cyclone may range from perhaps 10 or 20% up to about 100% of the conventional solids outlet. Preferably the slot area will be from ¼ to ½ times the area of the bottom of the cyclone.

The perforations should be sized so that in use from 1 to 50% of the gas exits via the perforations. We prefer to operate with 1.5 to 25% of the gas being removed with the solids, and ideally with 2 to 20% of the gas exiting the cyclone via the perforations.

Perforations are preferably uniformly distributed both radially and longitudinally. Preferably openings are present in at least every ⅓ segment of the cyclone barrel, that is, present in every 120° segment of the cyclone barrel. Ideally at least 4 sets of perforations are provided, distributed at 90° segments. Most preferably, from 6 to 20 longitudinal slots, or their equivalent, are evenly distributed around the circumference of the cyclone barrel.

The perforations may be slanted to minimize disruption of flow lines of particulates exiting the cyclone barrel through the perforations. The angle theta, as shown in FIGS. 8 and 9 is preferably between 5° and 70°. A preferred opening is one where the axis of the opening is angled in the direction of the flow within the cyclone, at least with regard to flow near the perforations, as opposed to flow within the central region of the cyclone, which can be very convoluted.

Perforations or slots may be offset in the cyclone wall, or one portion of the wall of the cyclone barrel may be punched in somewhat toward the interior of the cyclone to "peel off" that portion of the rotating solids and gas that collects near the wall. Preferably the interior of the cyclone is smooth and flush, save for perforations punched or drilled through it. While the perforations may be the sole solids outlet, the device works well with some solids withdrawn via a conventional reverse flow solids outlet.

DISCUSSION

The new cyclone is easy to fabricate via conventional techniques. The device significantly improves removal of fines, that is, 0–5 micron particles. These particles are removed as soon as they reach the cylindrical sidewall. In contrast, in conventional cyclones these solids must travel the length of the cyclone barrel to the conventional solids outlet, where the solids must exit normal to the gas flow. The new cyclone design will reduce erosion on power recovery turbine blades, and also reduce particulate emissions.

We claim:

1. In a fluidized catalytic cracking process wherein a heavy feed is catalytically cracked by contact with a regenerated cracking catalyst in a cracking reactor to produce lighter products and spent catalyst, and wherein spent catalyst is regenerated in a catalyst regeneration means containing primary and secondary separators for recovery of catalyst and fines from flue gas to produce a flue gas stream containing entrained catalyst fines, the improvement comprising use of a third stage separator to remove at least a portion of the catalyst fines from the flue gas, said third stage separator comprising:

a cylindrical cyclone body having a length and a cylindrical axis;

a tangential vapor inlet connective with an inlet end of said cyclone body for a stream of vapor and entrained fines;

a cylindrical vapor outlet tube within said inlet end of said cylindrical cyclone body for withdrawal of gas with a reduced entrained fines content, said outlet tube having a cylindrical axis aligned with said cylindrical axis of said cyclone body; and a plurality of radially and longitudinally distributed fines outlets for removing most of said entrained fines and a minor amount of gas, comprising at least two sets of openings over at least a third of the length of said cyclone body and wherein said sets of openings are uniformly radially distributed and wherein essentially all of said gas with a reduced entrained fines content is withdrawn via said vapor outlet tube.

2. The process of claim 1 wherein said fines outlets comprise at least 4 sets of openings uniformly distributed radially about said cyclone body.

3. The process of claim 1 wherein said fines outlets comprise 6–20 sets of slots, holes or perforations radially distributed about said cyclone body.

4. The process of claim 1 wherein said fines outlets are holes drilled or punched in said cyclone body.

5. The process of claim 1 wherein said fines outlets are uniformly distributed both radially and longitudinally throughout said cylindrical cyclone body.

6. The process of claim 1 wherein said cyclone body is horizontal.

7. The process of claim 1 wherein the open area of said openings is from 10% to 200% of a cross sectional area of said vapor outlet tube.

8. The process of claim 7 wherein the open area of said openings is from 20 to 100% of the open area of said vapor outlet tube.

9. The process of claim 1 wherein an additional fines outlet is provided as an opening through an end of the cyclone body opposing said vapor outlet tube.

10. The process of claim 1 wherein said third stage separator operates under a positive pressure.

11. The process of claim 1 wherein said cyclone body has an interior which is flush, and slanted openings through said cyclone body have an axis with an angle theta between a line tangential to the inner wall of said cyclone body and a line parallel to said opening through said cyclone body of from 5° to 70°.

* * * * *